(12) United States Patent
Wright

(10) Patent No.: US 9,150,139 B2
(45) Date of Patent: Oct. 6, 2015

(54) REDUCTANT REFILL AND PURGING SYSTEM

(75) Inventor: Cameron J. Wright, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 749 days.

(21) Appl. No.: 13/537,211

(22) Filed: Jun. 29, 2012

(65) Prior Publication Data

US 2014/0000719 A1    Jan. 2, 2014

(51) Int. Cl.
  *B65B 1/30* (2006.01)
  *B60P 3/22* (2006.01)

(52) U.S. Cl.
  CPC ............. *B60P 3/2245* (2013.01); *B60P 3/2255* (2013.01); *F01N 2610/142* (2013.01); *Y10T 137/0318* (2015.04); *Y10T 137/85986* (2015.04)

(58) Field of Classification Search
  CPC ............... B60P 2/2245; B60P 3/2255; Y10T 137/85986; Y02T 10/24; F01N 3/2066; F01N 2610/1413; F01N 1610/142
  USPC ............................ 141/198; 60/299; 137/565.11
  See application file for complete search history.

(56) References Cited

U.S. PATENT DOCUMENTS

2008/0298788 A1    12/2008    Martucci
2010/0326546 A1*   12/2010    Haeberer et al. .............. 137/558

* cited by examiner

*Primary Examiner* — Jason K Niesz

(57) ABSTRACT

A system for refilling a reductant tank of a first machine is provided. The system includes a reductant reservoir, a first valve, and a pump. The first valve is fluidly connected to the reductant reservoir. The pump is fluidly connected to the first valve. Further, a nozzle is fluidly connected to the first valve. The first valve provides a reductant flow from the reductant reservoir to the pump, and from the pump to the nozzle when in a first position, and reverses the reductant flow from the nozzle to the pump, and from the pump to the reductant reservoir in a second position. Also, a pilot line is selectively associated with an outlet of the pump and the first valve. When pressure between the pump and the nozzle exceeds a threshold, pilot pressure causes the first valve to shift from the first position to the second position.

20 Claims, 6 Drawing Sheets

REDUCTANT REFILL AND PURGING SYSTEM

TECHNICAL FIELD

The present disclosure relates to a reductant refill system, and more particularly to a refill system for a mobile machine that is designed for purging after refill.

BACKGROUND

Stranded reductant present in fluid lines associated with a reductant refill system has a tendency to freeze. In order to deal with this issue, typically heated lines are used to keep the reductant warm and prevent clogging of the fluid lines. For example, U.S. Published Application No. 2008/0298788 relates to a heated hose assembly including an extruded inner liner, an intermediate layer comprising strands of a nonmetallic material, and at least one heating wire. Each of the nonmetallic material and heating wires is interwoven about the exterior of the extruded inner liner. The heated hose assembly further includes an outer coating dispersed throughout the strands of the intermediate layer, and a crimp attachment component for attaching the at least one heating wire to a power source.

SUMMARY OF THE DISCLOSURE

In one aspect of the present disclosure a system for refilling a reductant tank of a first machine is provided. The system includes a reductant reservoir, a first valve, and a pump. The first valve is fluidly connected to the reductant reservoir. The pump is fluidly connected to the first valve. Further, a nozzle is fluidly connected to the first valve. The first valve provides a reductant flow from the reductant reservoir to the pump, and from the pump to the nozzle when in a first position, and reverses the reductant flow from the nozzle to the pump, and from the pump to the reductant reservoir in a second position. Also, a pilot line is selectively associated with an outlet of the pump and the first valve. When pressure between the pump and the nozzle exceeds a threshold, pilot pressure causes the first valve to shift from the first position to the second position.

In another aspect, a method for refilling a reductant tank of a first machine is provided. The method provides a reductant reservoir. The method provides a first valve fluidly connected to the reductant reservoir. The method also provides a pump fluidly connected to the first valve. Further, the method provides a nozzle fluidly connected to the first valve. The first valve provides a reductant flow from the reductant reservoir to the pump, and from the pump to the nozzle when in a first position, and reverses the reductant flow from the nozzle to the pump, and from the pump to the reductant reservoir in a second position. Additionally, the method provides a pilot line selectively associated with an outlet of the pump and the first valve. When pressure between the pump and the nozzle exceeds a threshold, pilot pressure causes the first valve to shift from the first position to the second position.

Other features and aspects of this disclosure will be apparent from the following description and the accompanying drawings.

DETAILED DESCRIPTION

Figure 1:
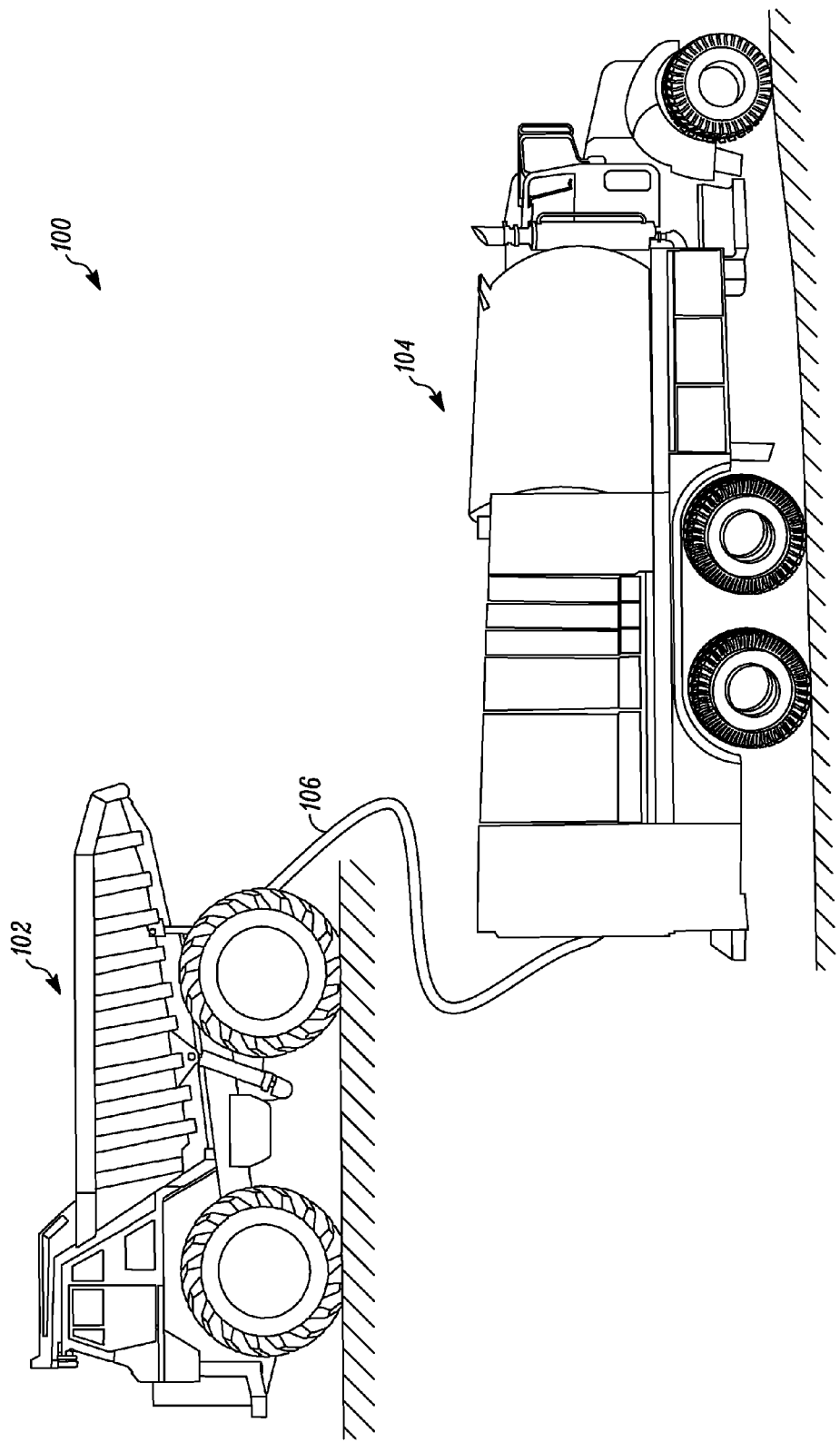
FIG. 1 is a diagrammatic view of an exemplary machine and an exemplary service truck, according to one embodiment of the present disclosure.

FIG. 1 illustrates an exemplary refill and purge system 100. In one embodiment, the refill and purge system 100 may include a first machine (hereinafter referred to as machine 102) and a second machine (hereinafter referred to as service truck 104). As illustrated in FIG. 1, the machine 102 may include an off-highway truck. However, the machine 102 may be one of many types of machines used in various industries, such as construction, mining, transportation, agriculture, waste management, and others. The machine 102 may include, for example, loaders, dozers, motor graders, on and off-highway trucks, tractors, compactors, and the like.

As shown in FIG. 1, in another embodiment, the refill and purge system 100 may also include the service truck 104. A person of ordinary skill in the art will appreciate that the service truck may 104 include any mobile machine configured to supply lubrication and other fluids for example, fuel and/or lubricating fluids, at a machine on site. Specifically, in the present disclosure, the service truck 104 may be used to supply a reductant to the machine 102. In one embodiment, the machine 102 may be removably connected to the service truck 104 in order to receive a supply of the reductant. It should be understood that the reductant may include, without any limitation, diesel exhaust fluid (DEF), ammonia or any other reducing agent. The location and proximity of the service truck 104 with respect to the machine 102 may vary.

As shown in FIG. 1, an external refill line 106 extending from the service truck 104 may be used to supply the reductant to the machine 102. The refill line 106 may be connected to the machine 102 at a position located at ground level. More specifically, the refill line 106 may be permanently connected to the service truck 104. A nozzle 202 may be coupled to a distal end of the refill line 106 (see FIG. 2). During a refill operation, the nozzle 202 may be connected to a receiver 203 located on the machine 102. It should be understood that the refill line 106 may include a hose or any other connecting line known in the art. Parameters related to the refill line 106 such as, for example, length, dimension, material used, etc. may vary.

FIGS. 2 to 5 are schematic diagrams depicting the reductant flow in the refill and purge system 100 during different machine cycles. In one embodiment, a reductant tank 204 may be present on-board the machine 102. The reductant tank 204 may be configured to store the reductant. For example, the reductant tank 204 may be present within the engine enclosure of the machine 102. It should be noted that the positioning, size and other parameters related to the reductant tank 204 may vary.

As shown in the accompanied drawings, the reductant tank 204 may include a level control valve 206. It should be understood that the level control valve 206 may be used to keep check of the level of the reductant in the reductant tank 204. In one example, the level control valve 206 may be provided on an inner surface of the reductant tank 204. The positioning of the level control valve 206 may vary without any limitation. Further, in one embodiment, the level control valve 206 may automatically shut off when the reductant tank 204 is full.

A reductant receiving line 208 may be present on the machine 102. The receiver 203 may be present at a first end of the reductant receiving line 208. The reductant receiving line 208 may connect to the reductant tank 204 at a second end, allowing the reductant tank 204 to be remotely located from the refill location. Parameters, for example, length, positioning, and the like, related to the reductant receiving line 208 may vary. Additionally, in one embodiment, the reductant tank 204 may include an air inlet valve 210. The air inlet valve 210 may be configured to introduce air in the reductant receiving line 208. It should be noted that the reductant tank 204 and the reductant receiving line 208 are components located on the machine 102.

Further, the nozzle 202 may be located at the distal end of the refill line 106. In one embodiment, the nozzle 202 may include a cam 212 configured to removably couple the nozzle 202 with the receiver 103 of the reductant receiving line 208. In one example, the cam 212 may be located on a hand held device such that the cam 212 can be manually operated to connect the receiver with the nozzle 202. As shown in FIGS. 2 to 5, the nozzle 202 may be fluidly connected to a pump 214 and a first valve 216 via a first line 218 present on the service truck 104. The pump 214 may include a variable displacement pump, a fixed displacement pump, or any other electrically driven or mechanically driven pump known in the art. It should be noted that the pump 214 may provide a continuous flow in a fixed direction within the service truck 104. Moreover, in one embodiment, a sight gauge 220 may be provided in the first line 218 in proximity to the pump 214 to allow the operator to check the flow of the reductant from the pump 214.

The first valve 216 may include a four way valve. More specifically, in one embodiment, the first valve 216 may include a spring loaded two position valve. A person of ordinary skill in the art will appreciate that depending upon the pressure applied on either side of the first valve 216, the first valve 216 may be in any one of a first position or a second position. It should be understood that the position of the first valve 216 may control the direction of flow of the reductant through the passages in the first valve 216. For example, when the first valve 216 is in the first position, the reductant flow may be pulled from a reductant reservoir 222 towards the pump 214 via the first valve 216. Also, the first valve 216 may provide a path for flow of the reductant from the pump 214 towards the nozzle 202. In another example, when in the second position, the connections of the first valve to the pump 214 and the nozzle 202 may be swapped, causing a reversal in the reductant flow direction.

Moreover, the first valve 216 may be fluidly connected to the reductant reservoir 222 via a second line 224. It should be noted that the reductant reservoir 222 may be located on the service truck 104 and may be configured to provide the reductant supply to the machine 102. Depending on the application, the size, location and positioning of the reductant reservoir 222 may vary without any limitation. A third line 226 may fluidly connect the nozzle 202 and the reductant reservoir 222. In one embodiment, a first check valve 228 may be disposed in the third line 226 in proximity with the reductant reservoir 222. In another embodiment, a restrictive orifice 230 may be connected in parallel with the first check valve 228.

Additionally, a pilot line 232 may be selectively associated with an outlet of the pump 214 and the first valve 216 as shown in the FIGS. 2 to 5. In one embodiment, the pilot line 232 may include an accumulator 234 and a second check valve 236. The accumulator 234 is provided to make up for leakages that may occur. The second check valve 236 may be located in a line connected to the pump 214. The second check valve 236 may be configured to hold and build up pressure in the pilot line 232. As will be described in detail later, when pressure between the pump 214 and the nozzle 202 exceeds a pre-determined threshold, pilot pressure may cause the first valve 216 to shift from the first position to the second position.

Further, a second valve 238 may be disposed in the pilot line 232. In one embodiment, the second valve 238 may include a two way valve. Further, in another embodiment, the second valve 238 may be a spring loaded two position valve. The second valve 238 may be either in a first position wherein the pilot line 232 is isolated from the reductant reservoir 222; or in a second position wherein the reductant reservoir 222 is fluidly connected to the pilot line 232. As will be described in connection with FIGS. 4 and 5, when in the second position, the second valve 238 may be configured to allow the reductant to flow from the pilot line 232 through the nozzle 202 to the pump 214, causing the first valve 216 to shift from the second position to the first position.

Figure 2:
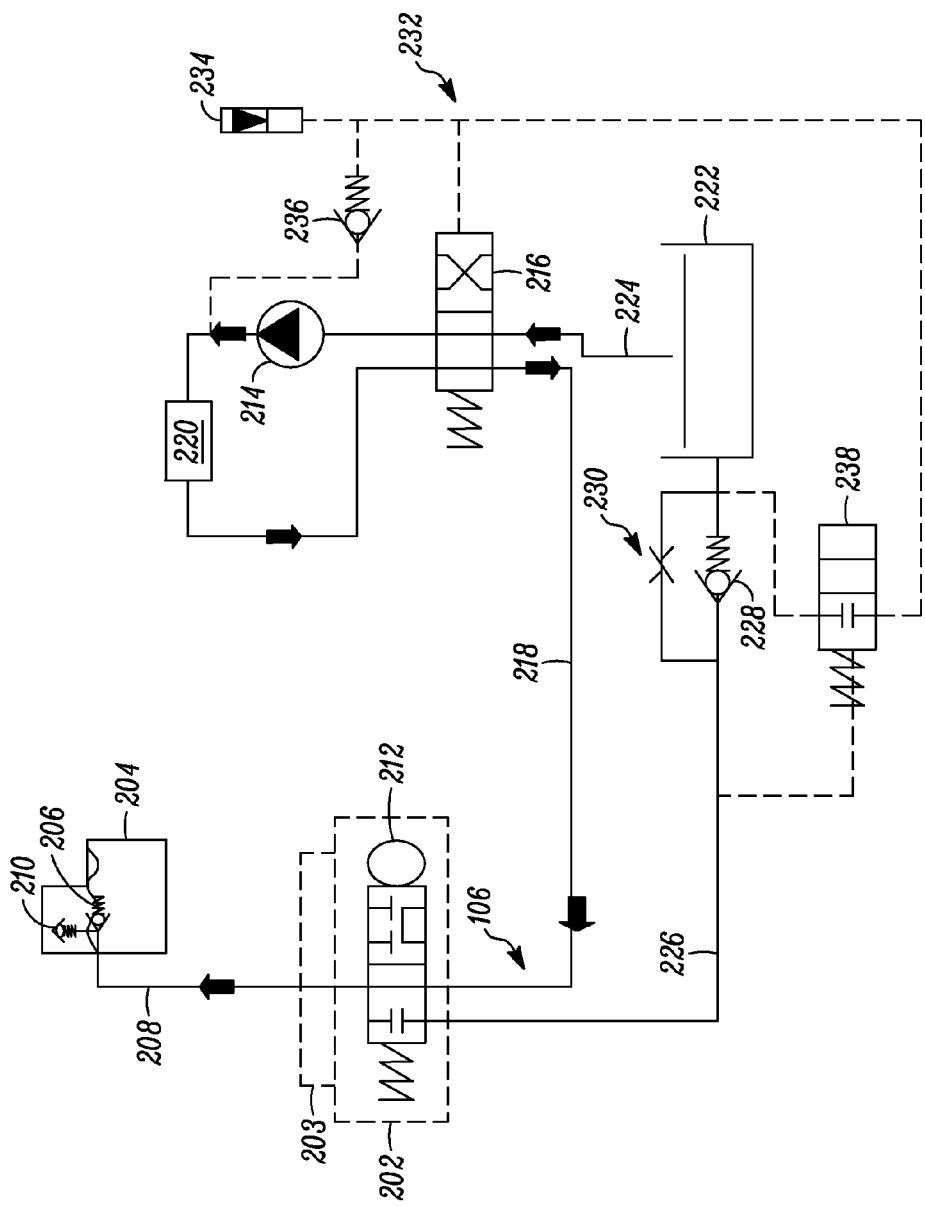
FIG. 2 is a flow diagram of a reductant during a fill cycle.
Figure 3:
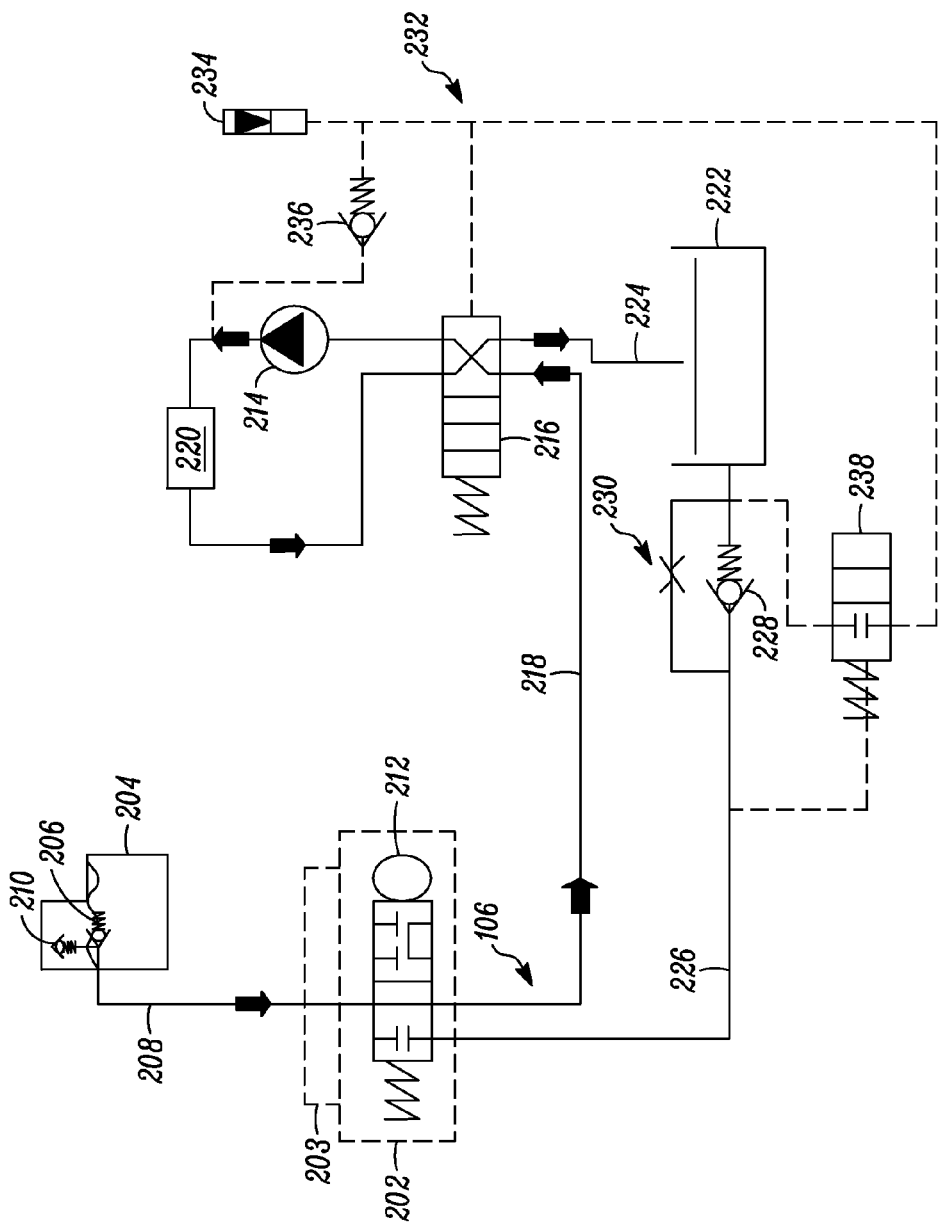
FIG. 3 is a flow diagram of the reductant during a purge cycle.

FIG. 2 illustrates the reductant flow in the refill and purge system 100 during a fill cycle. The arrows in the figure depict the direction of the reductant flow. During the fill cycle, the receiver of the machine 102 may be fluidly coupled with the nozzle 202 of the service truck 104. When the nozzle is in a first position, as shown in FIGS. 2 and 3, the reductant flow through the nozzle 202 is allowed to or from the pump 214. Referring to FIG. 2, the reductant flow may be pulled from the reductant reservoir 222 towards the pump 214 via the first valve 216 in the first position. In one embodiment, the operator may observe the reductant flow in the refill and purge system 100 through the sight gauge 220.

As shown in FIG. 2, the reductant may flow through the first valve 216 in the first position and into the reductant receiving line 208 of the machine 102. Thus, during the fill cycle the reductant may be supplied to the reductant tank 204 on the machine 102 from the reductant reservoir 222 located on the service truck 104, via the nozzle 202, the pump 214, and the first valve 216 located on the service truck 104. A person of ordinary skill in the art will appreciate that during the fill cycle, the pressure in the refill and purge system 100 may be relatively low. As a result, the reductant flow across the second check valve 236 may be restricted, thereby isolating the pilot line 232 from the refill and purge system 100.

In one embodiment, when the reductant tank 204 is full, the level control valve 206 may automatically shut off. Also, the level control valve 206 may be configured to create a back-pressure in the refill and purge system 100 through the nozzle 202 and the first valve 216 in the first position to the pump 214 based on a filled condition of the reductant tank 208. A person of ordinary skill in the art will appreciate that reductant build up in the reductant receiving line 208 of the machine 102 and the first line 218 of the service truck 104 may cause a deadhead condition of the pump 214.

Subsequently, as pressure builds in the first line 218, the reductant present in the refill and purge system 100 may flow into the pilot line 232 via the second check valve 236. In one embodiment, the second check valve 236 may include a non-return valve configured to prevent a back flow of the reductant. Further, in one embodiment, the reductant flow may pressurize the accumulator 234 and fill the pilot line 232 with the reductant. It should be noted that in response to filling of the reductant in the pilot line 232, the pressure in the pilot line 232 may increase.

In another embodiment, when pressure between the pump 214 and the nozzle 202 exceeds a pre-determined threshold, the pilot pressure may cause the first valve 216 to shift from the first position shown in FIG. 2 to the second position shown in FIG. 3. In one example, a pressure of approximately 23 psi in the pilot line 232 may cause the change in position of the first valve 216. As shown in FIG. 3, due to change in the position of the first valve 216, the connections of the first valve 216 to the pump 214 and the nozzle 202 may be swapped. As a result, the direction of the reductant flow in the first and second lines 218, 224 may be reversed. A person of ordinary skill in the art will appreciate that the pressure trapped in the pilot line 232 may hold the first valve 216 in the second position. In one embodiment, the accumulator 234 may be configured to make up leakage in the refill and purge system 100.

During a purge cycle, the reductant in the reductant receiving line 208 may be pulled towards the pump 214 as shown in FIG. 3. In one embodiment, the air inlet valve 210 may be configured to introduce air into the reductant receiving line 208, in response to the reductant tank 204 being filled. A person of ordinary skill in the art will appreciate that the introduction of air in the reductant receiving line 208 may prevent creation of vacuum due to suction in the reductant receiving line 208 caused by the pump 214. The reductant may be pulled via the pump 214 into the first valve 216 and towards the reductant reservoir 222. Hence, the reductant present in the reductant receiving line 208 may be purged during the purge cycle. A person of ordinary skill in the art will appreciate that the second valve 238 remains disconnected from the circuit during the fill and purge cycles.

Figure 4:
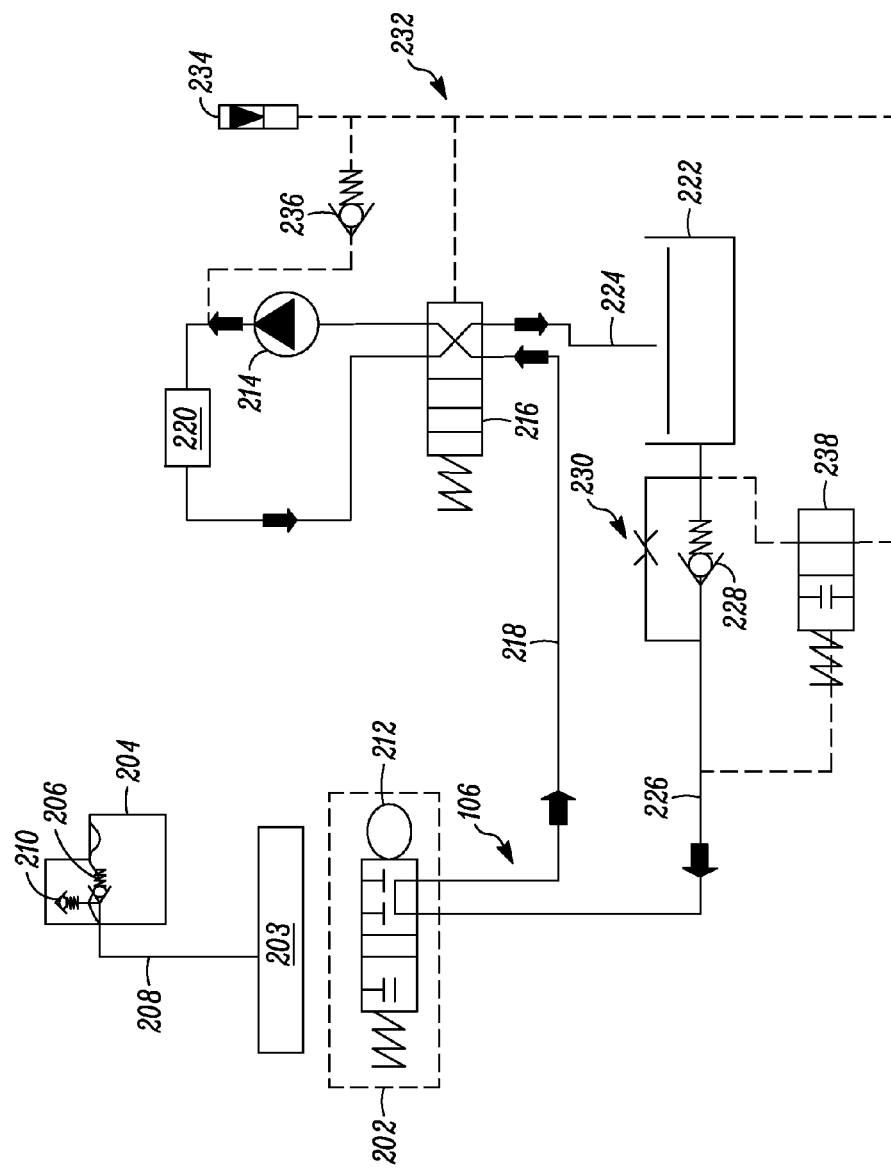
FIG. 4 is a flow diagram of the reductant during a drain cycle.

Referring to FIG. 4, in one embodiment, the operator may isolate the nozzle 202 from the reductant tank 204. In one example, the operator may mechanically disengage the receiver from the nozzle 202 by rotating the cam 212. Hence, the isolation of the nozzle 202 from the reductant tank 204 may involve hydraulically breaking the connection between the machine 102 and the service truck 104. The nozzle 202 shown in FIGS. 4 and 5 may be in a second position, wherein a fluid connection is provided via the nozzle 202 through the first valve 216 in the second position to the pump 214. Thus, as described above, the nozzle 202 may be manually moved from the first position shown in FIGS. 2 and 3 to the second position shown in FIGS. 4 and 5.

Referring to FIG. 4, in response to shifting the nozzle 202 to the second position, the third line 226 may be fluidly connected to the first line 218 via the nozzle 202. It should be understood that on shifting the nozzle 202 to the second position, the reductant flow may loop through the nozzle 202 on the service truck 104. Also, suction may be created in the third line 226 due to connection with the pump 214.

In one embodiment, as a result of the suction created in the third line 226, the position of the second valve 238 may change from the first position (see FIGS. 2 and 3) to the second position as shown in FIG. 4. Thus, due to the change in the position of the second valve 238, the pilot line 232 may be hydraulically connected to the reductant reservoir 222. In another embodiment, the reductant present in the pilot line 232 may be drained into the reductant reservoir 222 via the pump 214. The arrows shown in FIG. 4 depict the direction of the reductant flow from the pilot line 232 via the nozzle 202, and the pump 214 into the reductant reservoir 222. In yet another embodiment, a portion of the reductant may trickle through the restrictive orifice 230. One of ordinary skill in the art will appreciate that this reductant flow through the restrictive orifice 230 may facilitate in priming the circuit. Also, in response to the draining of the reductant in the pilot line 232, the pressure in the pilot line 232 may drop or return back to atmospheric pressure.

Figure 5:
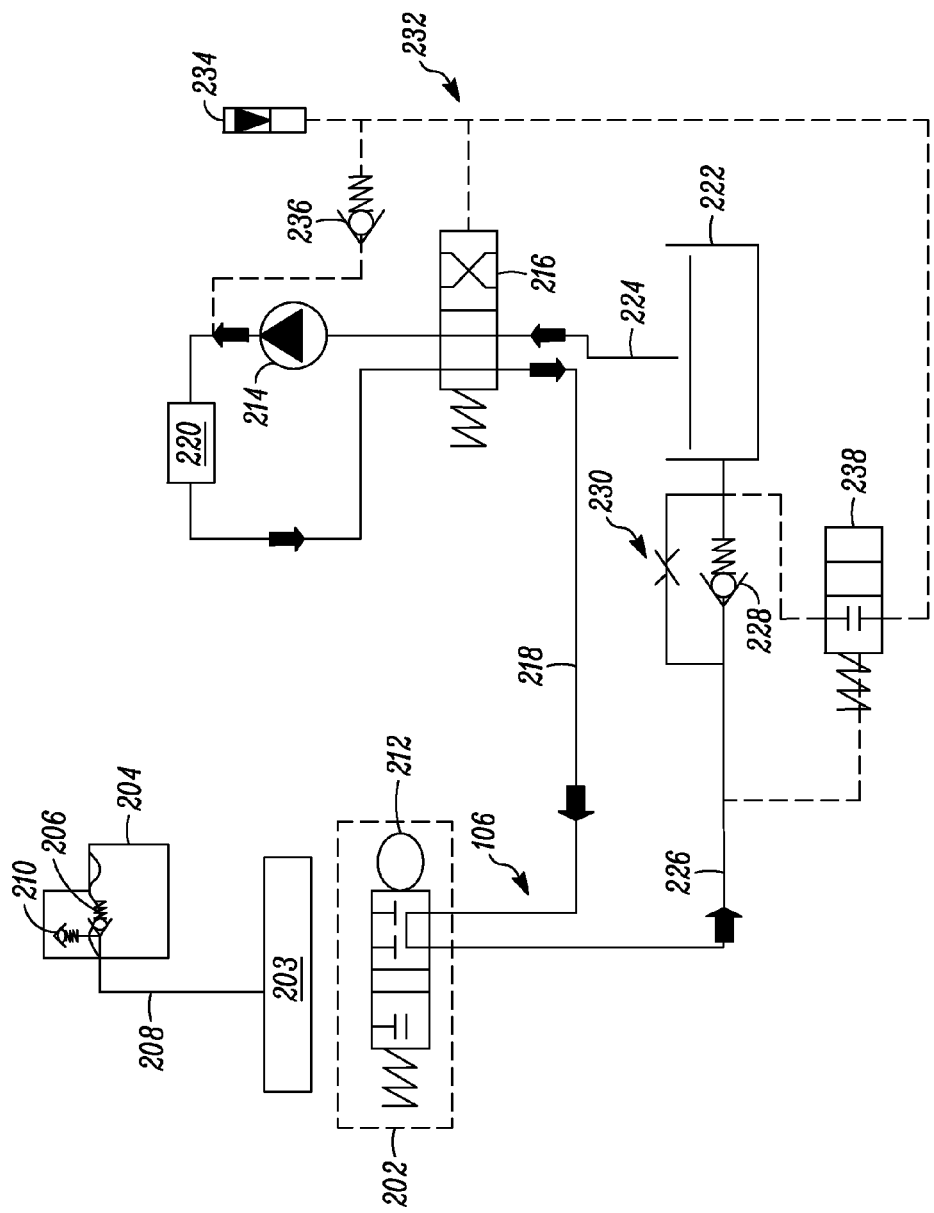
FIG. 5 is a flow diagram of the reductant in response to drainage of a pilot circuit.
Figure 6:
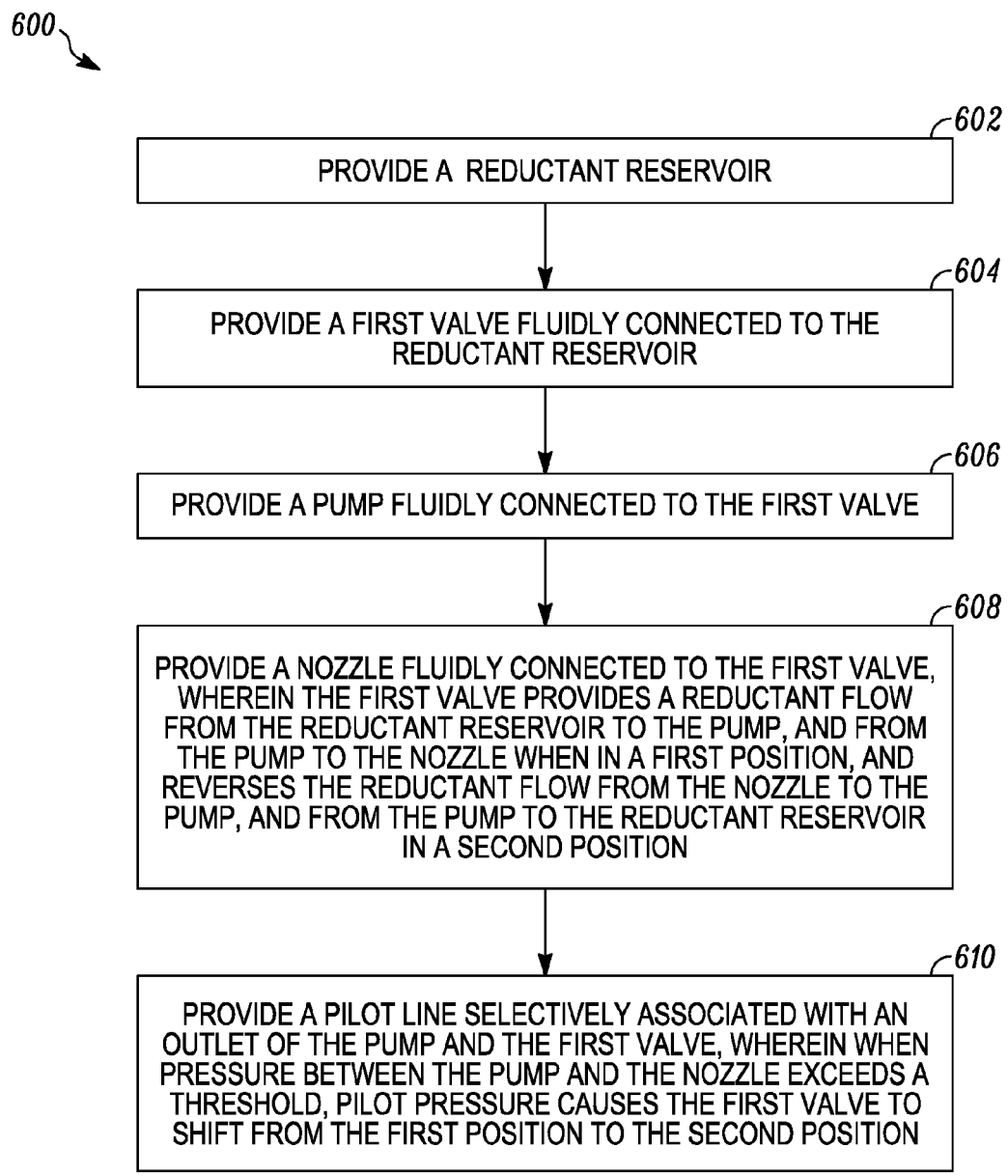
FIG. 6 is a flowchart for refilling a reductant tank is provided.

In one embodiment, in response to the decrease in pressure in the pilot line 232, the first valve 216 may return to the first position as shown in FIG. 5. It should be noted that the pressure in the pilot line 232 may be relatively low and insufficient to trip to purging. A person of ordinary skill in the art will appreciate that the first position of the first valve 216 may be the same as an initial position of the first valve 216 (see FIG. 2).

Additionally, as shown in FIG. 5, due to shifting of the first valve 216, the position of the second valve 238 may return to an initial position, thereby isolating the pilot line 232 from the reductant reservoir 222. It should be understood that the isolation of the pilot line 232 may be in response to the drainage of the pilot line 232. In one embodiment, the reductant within the service truck 104 may flow from the reductant reservoir 222 through the pump 214, via the first valve 216 in the first position into the nozzle 202 in the second position, and back into the reductant reservoir 222. More specifically, the reductant may continue to flow within the service truck 104 until any machine is connected with the service truck 104.

INDUSTRIAL APPLICABILITY

The present disclosure relates to purging of the reductant receiving line 208 associated with the machine 102. The disclosure is an alternative to using heated lines. As described above, the disclosure makes use of an all hydro-mechanical construction wherein the purging of the reductant receiving line 208 may occur automatically at the end of the fill cycle. The disclosure avoids the use of electronic control modules, harnesses and other sensors. Since the service trucks 104 are typically subjected to rough handling, the mechanical construction provides a robust and cost effective solution.

Moreover, the design involves circulation of the reductant within the service truck 104. In one embodiment, the circuit associated with the service truck 104 may be provided in a single block. Also, in another embodiment, a heat exchanger may be placed in proximity with the circuit on the service truck 104 in order to maintain the temperature of the reductant. This may result in ease of construction and integration of the circuit on the service truck 104.

At step 602, the reductant reservoir 222 is provided on the service truck 104. At step 604, the first valve 216 may be provided. The first valve 216 is fluidly connected to the reductant reservoir 222. Further, at step 606, the pump 214 may be provided. The pump 214 may be fluidly connected to the first valve 216.

At step 608, the nozzle 202 may be provided. The nozzle 202 may be fluidly connected to the first valve 216. As described in connection with FIGS. 2 and 5, the first valve 216 may provide the reductant flow from the reductant reservoir 222 to the pump 214, and from the pump 214 to the nozzle 202 when in the first position. Additionally, as described in connection with FIGS. 3 and 4 the first valve 216 may reverse the reductant flow from the nozzle 202 to the pump 214, and from the pump 214 to the reductant reservoir 222 when in the second position.

Further, at step 610, the pilot line 232 may be provided. The pilot line 232 may be selectively associated with the outlet of the pump 214 and the first valve 216. As described above, when the pressure between the pump 214 and the nozzle 202 exceeds the threshold, the pilot pressure causes the first valve 216 to shift from the first position to the second position.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for refilling a reductant tank of a first machine, the system comprising:
   a reductant reservoir;
   a first valve fluidly connected to the reductant reservoir;
   a pump fluidly connected to the first valve;
   a nozzle fluidly connected to the first valve, wherein the first valve provides a reductant flow from the reductant reservoir to the pump, and from the pump to the nozzle when in a first position, and reverses the reductant flow from the nozzle to the pump, and from the pump to the reductant reservoir in a second position; and
   a pilot line selectively associated with an outlet of the pump and the first valve, wherein when pressure between the pump and the nozzle exceeds a threshold, pilot pressure causes the first valve to shift from the first position to the second position.

2. The system of claim 1 further including a fluid line between the nozzle and the reductant reservoir, the nozzle having a first position that allows the reductant flow through the nozzle to or from the pump, and a second position that provides a fluid connection from the fluid line to the first valve in the second position to the pump.

3. The system of claim 1 further including a second valve disposed within the pilot line fluidly connected to the nozzle, the second valve having a first position that isolates the pilot line from the nozzle and a second position that allows the reductant to flow from the pilot line through the nozzle to the pump, causing the first valve to shift from the second position to the first position.

4. The system of claim 1, wherein the reductant tank is located on-board the first machine, the reductant tank further including a level control valve, wherein the level control valve is configured to shut-off and create a back-pressure in the system through the nozzle and the first valve in the first position to the pump based on a filled condition of the reductant tank.

5. The system of claim 4 further including an air inlet valve located in the reductant tank, wherein the air inlet valve is configured to introduce air into the system when the first valve is in the second position.

6. The system of claim 2, wherein the nozzle is manually moved from the first position to the second position.

7. The system of claim 1 further including a check valve disposed in the pilot line associated with the outlet of the pump, the first check valve configured to prevent reverse flow of the reductant towards the pump.

8. The system of claim 1 further including an accumulator provided in the pilot line.

9. The system of claim 2 further including a check valve in the fluid line, the second check valve configured to prevent the reductant flow towards the reductant reservoir.

10. The system of claim 1 further including a sight gauge to check the reductant flow from the pump.

11. A method for refilling a reductant tank of a first machine, the method comprising:
   providing a reductant reservoir;
   providing a first valve fluidly connected to the reductant reservoir;
   providing a pump fluidly connected to the first valve;
   providing a nozzle fluidly connected to the first valve, wherein the first valve provides a reductant flow from the reductant reservoir to the pump, and from the pump to the nozzle when in a first position, and reverses the reductant flow from the nozzle to the pump, and from the pump to the reductant reservoir in a second position; and
   providing a pilot line selectively associated with an outlet of the pump and the first valve, wherein when pressure between the pump and the nozzle exceeds a threshold, pilot pressure causes the first valve to shift from the first position to the second position.

12. The method of claim 11 further including providing a fluid line between the nozzle and the reductant reservoir, the nozzle having a first position that allows the reductant flow through the nozzle to or from the pump and a second position that provides a fluid connection from the fluid line to the first valve in the second position to the pump.

13. The method of claim 11 further including providing a second valve in the pilot line fluidly connected to the nozzle, the second valve having a first position that isolates the pilot line from the nozzle and a second position that allows the reductant to flow from the pilot line through the nozzle to the pump, causing the first valve to shift from the second position to the first position.

14. The method of claim 11 further including introducing air into the system when the first valve is in the second position via an air inlet valve provided in the reductant tank.

15. The method of claim 12 further including manually shifting the nozzle from the first position to the second position.

16. A refill and purge system comprising:
   a first machine including:
      a reductant tank located on-board the first machine; and
      a receiver fluidly connected to the reductant tank; and
   a second machine removably connected to the first machine via a refill line, the second machine including:
      a reductant reservoir;
      a first valve fluidly connected to the reductant reservoir;
      a pump fluidly connected to the first valve;
      a nozzle located at one end of the refill line, the nozzle configured to connect with the receiver, wherein the nozzle is fluidly connected to the first valve, and wherein the first valve provides a reductant flow from the reductant reservoir to the pump, and from the pump to the refill line and the nozzle when in a first position, and reverses the reductant flow from the nozzle to the pump, and from the pump to the reductant reservoir in a second position; and
      a pilot line selectively associated with an outlet of the pump and the first valve, wherein when pressure between the pump and the nozzle exceeds a threshold, pilot pressure causes the first valve to shift from the first position to the second position.

17. The refill and purge system of claim 16 further including a fluid line between the nozzle and the reductant reservoir, the nozzle having a first position that allows the reductant flow through the nozzle to or from the pump, and a second position that provides a fluid connection from the fluid line to the first valve in the second position to the pump.

18. The refill and purge system of claim 16 further including a second valve disposed within the pilot line fluidly connected to the nozzle, the second valve having a first position that isolates the pilot line from the nozzle and a second position that allows the reductant to flow from the pilot line through the nozzle to the pump, causing the first valve to shift from the second position to the first position.

19. The refill and purge system of claim 16, wherein the reductant tank further includes a level control valve, the level control valve configured to shut-off and create a back-pressure in the refill and purge system through the nozzle and the first valve in the first position to the pump based on a filled condition of the reductant tank.

20. The refill and purge system of claim 17, wherein the nozzle is manually moved from the first position to the second position.

* * * * *